United States Patent [19]

Underwood

[11] Patent Number: 4,489,622

[45] Date of Patent: Dec. 25, 1984

[54] DUAL WET OUTPUT CLUTCH FOR POWER SELECTION IN A CONTINUOUSLY VARIABLE TRANSMISSION

[75] Inventor: Herbert N. Underwood, Chicago, Ill.

[73] Assignee: Borg-Warner Corporation, Chicago, Ill.

[21] Appl. No.: 425,735

[22] Filed: Sep. 28, 1982

[51] Int. Cl.³ .................... F16H 3/14; F16H 3/08; F16D 19/00; F16D 11/00

[52] U.S. Cl. ........................... 74/361; 74/330; 74/333; 192/87.17; 192/51; 192/53 F

[58] Field of Search ............ 474/72; 192/87.16, 87.17, 192/87.18, 87.19, 51, 21, 48.91; 74/329, 330, 331, 333, 377, 337.5, 339, 7 A, 689, 336 B, 361; 192/53 F, 94, 89 A

[56] References Cited

U.S. PATENT DOCUMENTS

| | | | |
|---|---|---|---|
| 2,125,433 | 8/1938 | Dunkelow | 74/377 X |
| 2,149,020 | 2/1939 | Hering | 74/339 |
| 2,315,808 | 4/1943 | Miller | 74/343 |
| 2,325,647 | 8/1943 | Adamson | 74/377 X |
| 2,485,688 | 10/1949 | Banker | 192/87.19 |
| 2,700,312 | 1/1955 | Smirl | 74/763 |
| 2,733,613 | 2/1956 | Kreis | 74/330 X |
| 2,757,557 | 8/1956 | Hoffman | 192/87.19 |
| 2,893,524 | 7/1959 | Ferrier | 192/94 X |
| 3,158,244 | 11/1964 | Lanigan, Jr. et al. | 192/94 X |
| 3,566,707 | 3/1971 | Schulz | 74/377 |
| 3,745,847 | 7/1973 | Worner et al. | 74/339 |
| 3,802,294 | 4/1974 | Smirl | 74/759 |
| 4,060,012 | 11/1977 | Giacosa | 74/689 |
| 4,125,037 | 11/1978 | Palmer et al. | 74/732 |
| 4,228,691 | 10/1980 | Smirl | 474/12 |
| 4,241,618 | 12/1980 | Smirl | 74/863 |
| 4,290,320 | 9/1981 | Abbott | 74/689 |
| 4,304,150 | 12/1981 | Lupo et al. | 74/677 |
| 4,433,594 | 2/1984 | Smirl | 74/689 |

*Primary Examiner*—Allan D. Herrmann
*Assistant Examiner*—Stephen B. Andrews
*Attorney, Agent, or Firm*—James A. Geppert

[57] ABSTRACT

A dual wet output clutch for a continuously variable transmission which acts as a starting clutch upon a signal from a throttle induced hydraulic fluid supply to connect the transmission with the vehicle wheels and replaces a mechanical forward-neutral-reverse selection by hydraulic actuation of one of the dual clutches to provide forward or reverse power. Also a secondary mechanism is utilized with the reverse gear to deactivate the reverse clutch in the forward mode and reduce drag loss.

8 Claims, 2 Drawing Figures

DUAL WET OUTPUT CLUTCH FOR POWER SELECTION IN A CONTINUOUSLY VARIABLE TRANSMISSION

BACKGROUND OF THE INVENTION

The present invention relates to a starting clutch for a continuously variable transmission that also provides for the selection of the power mode for a vehicle or other mobile equipment. Numerous versions of continuously variable transmissions utilizing variable pulleys and a continuous belt are presently known in the prior art, and the generally accepted arrangement for an automotive vehicle utilizes a clutch and a forward-neutral-reverse selector mechanism between the engine or prime mover and the variable pulleys. However, the rate at which the belt can be shifted diminishes as the pulley speed decreases. Also, the vehicle and pulleys must be brought to a complete halt in order to shift from forward to reverse with reversal of the direction of rotation of the pulleys.

To overcome these problems, the clutch and the selector mechanism have been transferred from a location between the engine and the pulleys to a position between the pulleys and the drive to the vehicle wheels, as shown in the Smirl U.S. Pat. No. 4,241,618. In this arrangement, the pulleys are continuously rotated, even at idle rpm, while the engine is running. Initiation of vehicle movement is accomplished by a speed-responsive friction starting device and the power mode, either forward or reverse, attained through a mechanical selector.

Also known in the prior art is the use of a dual clutch arrangement acting in a vehicle transmission. A dual clutch is utilized with each clutch plate being separately hydraulically actuated to provide for the forward speed ratios, reverse and neutral. However, the clutches are used in conjunction with friction brake bands engaging brake drums which operate in conjunction with one or more planetary gear sets. One major problem in this type of arrangement is the amount of drag losses that occur due to incomplete disengagement of the clutches and/or brake bands.

The present invention provides a non-mechanical power mode selector arrangement for a continuously variable transmission without the drag losses previously found in dual clutch transmissions.

SUMMARY OF THE INVENTION

The present invention relates to the provision of a novel dual starting clutch for a continuously variable transmission wherein the dual clutches independently provide for the forward and reverse power modes of the transmission to the vehicle wheels without halting or reversing the transmission to shift pulleys. The dual clutch arrangement provides one clutch disc operatively connected to the forward gear train for the vehicle wheels while the other clutch disc is operatively connected to the reverse gear train for the wheels. The clutch discs are separated by an intermediate pressure plate, and a hydraulically-actuated pressure plate is positioned on the side of each clutch disc opposite to the intermediate plate. Selective hydraulic actuation of either pressure plate will cause engagement with its respective clutch disc to initiate movement in the forward or reverse direction.

The present invention also comprehends the provision of a novel dual starting clutch for a continuously variable transmission wherein the independent clutch plates drive the forward gear set and the reverse gear set, and a spring clutch is operatively connected to the reverse gear set to deactivate the reverse clutch in the forward mode to eliminate any drag loss caused by the reverse clutch.

Further objects of the present invention are to provide a construction of maximum simplicity, efficiency, economy and ease of assembly and operation, and such further objects, advantages and capabilities as will later more fully appear and are inherently possessed thereby.

DESCRIPTION OF THE DRAWING

FIG. 1 is a longitudinal cross sectional view of the dual clutch and gear set assembly as utilized for a continuously variable transmission.

FIG. 2 is a partial cross sectional view showing the reverse gear set deactivation assembly in its alternate position.

DESCRIPTION OF PREFERRED EMBODIMENT

Figure 1:
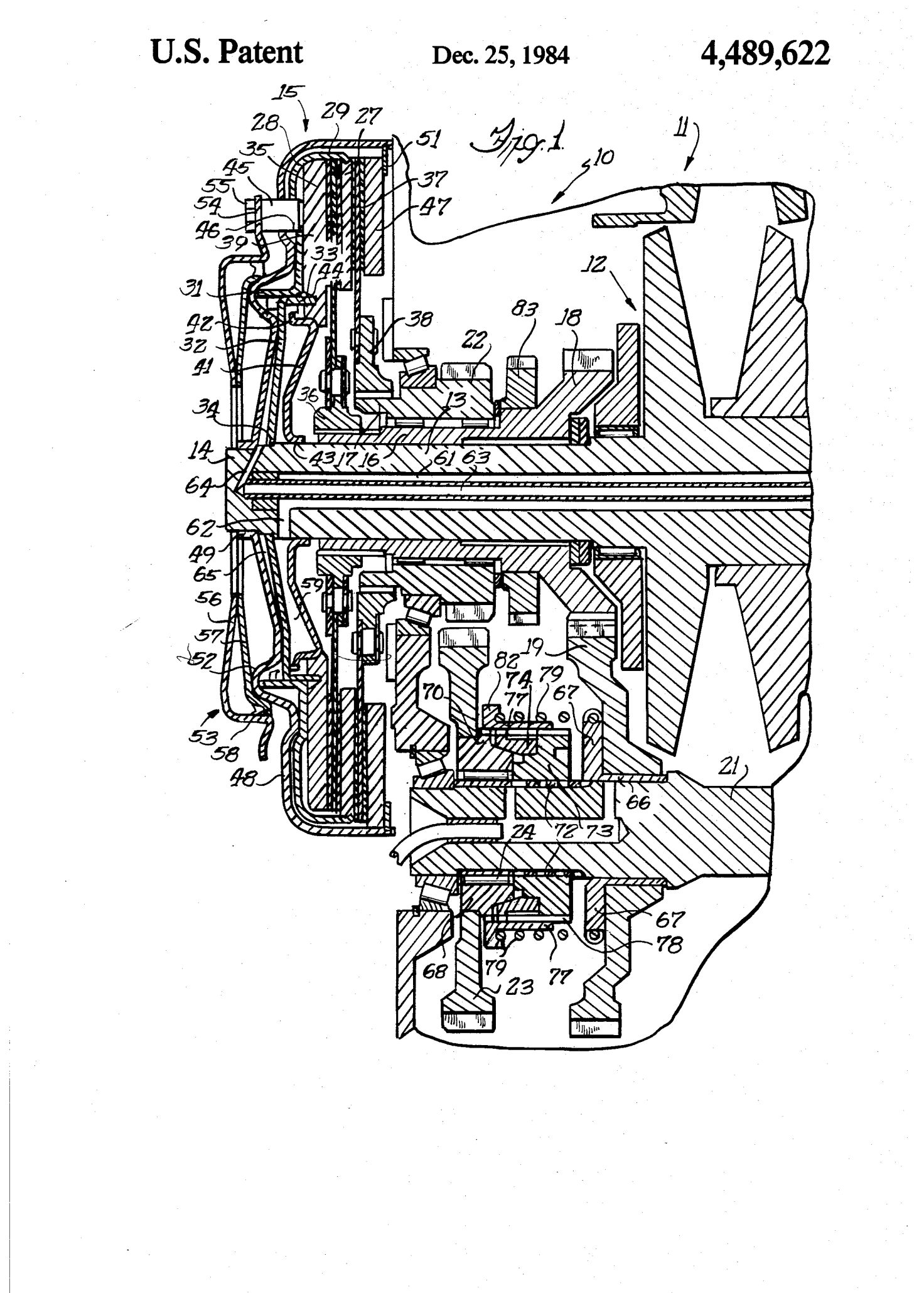

Referring more particularly to the disclosure in the drawing wherein is shown an illustrative embodiment of the present invention, FIG. 1 discloses a continuously variable transmission and clutch assembly 10 wherein a first variable pulley 11 on the driving shaft from the vehicle engine (not shown) drives a second variable pulley 12 through an endless belt (not shown) to constantly rotate a second shaft 13 on which the pulley 12 is mounted. A dual clutch assembly 15 is mounted on the stepped end 14 of shaft 13 to alternately drive a first sleeve shaft 16 and a second sleeve shaft 17, both encompassing the shaft 13. The first sleeve shaft at its rear end terminates in a forward gear 18 meshing with a similar gear 19 connected to a third or driven shaft 21 for rotation of the vehicle wheels. A reverse gear set includes a gear 22 at the rear end of the outer or second sleeve shaft 17, a gear 23 mounted on bearings 24 on the third shaft 21 and an idler gear (not shown) on an idler shaft and meshing with both gears 22 and 23 to provide reverse rotation of shaft 21.

The dual clutch assembly 15 includes an intermediate annular pressure plate 27 suitably secured to the outer axial flange 29 of an annular plate or support 28, and an inner flange 31 of plate 28 is secured, as by welding, to the outer flange 33 of an annular pressure fluid distributing plate 32; which in turn has its inner diameter 34 secured to the shaft 13. A forward clutch plate 35 is mounted on a hub 36 splined to first sleeve shaft 16 and positioned on one side of pressure plate 27, while a reverse clutch plate 37 is secured to a hub 38 splined to the second sleeve shaft 17 and positioned on the opposite side of pressure plate 27.

A first axially movable pressure plate 39 is located with respect to intermediate pressure plate 27 to sandwich the clutch plate 35 therebetween and is operatively connected to the outer flange 42 of an annular dished piston plate 41 having an inner flange 43 slidably mounted on the shaft 13. The pressure plate 39 has an annular groove 44 receiving the outer flange 33 of plate 32, and a plurality of collars 45, welded to the pressure plate 39, extend through openings 46 in the annular plate 28.

A second or reverse axially movable pressure plate 47 on the opposite side of intermediate pressure plate 27 from forward pressure plate 39 cooperates with pressure plate 27 to sandwich the reverse clutch plate 37 therebetween. This pressure plate 47 is operatively connected to an outer dished plate 48 and retained therein by snap ring 51; the outer plate extending around the plate 28 and inner piston 41 and terminating in an inner flange 49 slidably mounted on the stepped end 14 of shaft 13. The outer plate has openings receiving the collars 45 and an annular channel 52 accommodating the inner flange 31. A return spring assembly has a retainer 53 with an outer flange 54 secured between the collars 45 and the heads of bolts 55 in threaded engagement with the collars, an intermediate axial portion and an inner conical portion 56 bearing at its inner edge onto the inner edge of a conical spring 57 having an outer edge 58 contacting the channel 52 of the plate 48.

A first pressure chamber 59 is formed between the fluid distributing plate 32 and the piston plate 41 and communicates with an annular passage 61 for pressurized hydraulic fluid in the shaft 13 via one or more lateral passages 62. A center conduit in passage 61 forms a second passage 63 for hydraulic fluid extending through the axis of shaft 13 and passage 61 to terminate in one or more lateral passages 64 leading to a second pressure chamber 65 formed between the plate 32 and the outer plate 48. Appropriate annular resilient seals act to prevent leakage from the pressure chambers, and cooling fluid is admitted to the clutch plates 35 and 37 to cool the friction surfaces during engagement or disengagement.

The forward gear 19 on the driven shaft 21 is operatively connected to a hub 66 splined onto shaft 21 and having a radial flange 67. Also, the reverse gear 23 is operatively mounted on a hub 68 having a conical portion 69 extending toward the forward gear 19; a flange 70 on the hub being provided with axially extending teeth 71. The driven shaft 21 between the two hubs is provided with a coarse thread or helix 72 to cooperate with an internally threaded hub 73 carrying a synchronizer ring 74 having a complementary internal conical surface 75 and axial external teeth 76, and a coupling sleeve 77 is provided with axial internal splines engaging splines 78 on hub 73 and complementary to the teeth 71 and 76. A conventional wave spring (not shown) is located between the hub 73 and synchronizer ring 74 to bias the ring toward the hub 68. A torsional spring 79 encompasses the generally cylindrical exterior surface of the sleeve 77 and has one end anchored, as at 80, to the flange 67 while the opposite end is anchored in a groove 81 in an enlarged end 82 of the sleeve. The conical portion 69 and complementary surface 75 on the synchronizing ring 74 provide a synchronizer cone clutch arrangement which operates like a conventional synchronizer to prevent clashing of the teeth 71 and 78 upon engagement.

In the clutching arrangement as shown in FIG. 1, the dual clutch 15 provides additional problems of drag losses due to low clearance between the clutch plates and pressure plates and viscous drag losses caused by the presence of the cooling fluid on and between the friction surfaces. Thus, when the forward clutch plate 35 is engaged between the pressure plates 27 and 39, the reverse clutch plate may provide undesirable spin drag losses which reduce the efficiency of the total drive assembly. Also, when the reverse clutch plate 37 is engaged, there will be drag losses resulting from low clearance in the forward clutch plate, however, the drag losses in reverse are not of importance because the vehicle will be moving in reverse at relatively low speeds for a short distance.

As drag losses are undesirable when the forward clutch is engaged, the hub 73, synchronizer ring 74 and coupling sleeve 77 are utilized to eliminate these drag losses. As seen in FIG. 1, the torsional spring 79 urges the sleeve 77 and hub 73 to rotate so that the coarse thread 72 causes movement of the hub toward the reverse gear hub 68 so that the conical surfaces 69 and 75 engage; the spring urging the sleeve 77 axially relative to the hub so that the coupling sleeve teeth 78 engage the ring teeth 76 and the teeth 71. Thus, the reverse gear 23 will rotate the driven shaft 21 when the reverse clutch plate 37 is engaged. Likewise, in the static condition for the clutch assembly, the torsional spring 79 will urge the hub, ring and sleeve to their engaged positions.

Upon acceleration of the vehicle engine, the hydraulic pressure increases due to operation of a hydraulic pump coupled to the transmission. The increased pressure may be applied to either chamber 59 or chamber 65 to cause engagement of the respective clutch plate depending on the operator's control of the hydraulic fluid through passage 61 or 63. Where fluid is directed to chamber 65 and the coupling sleeve 77 engaged with the teeth 71, the reverse gear train will rotate the driven shaft 21 in one direction. Upon switching the fluid pressure from chamber 65 to pressure chamber 59 to cause engagement of clutch plate 35 and release clutch plate 37, the resulting rotation in the sleeve shaft 16 rotates the gears 18 and 19 to rotate shaft 21 in the direction opposite to reverse clutch engagement. Thus the shaft 21 rotates opposite to the direction of rotation of the hub 73 as urged by the torsional spring 79 so that the thread 72 on shaft 21 causes hub 73 to axially retract from the hub 68; resulting in retraction of the synchronizer ring 74 and coupling sleeve 77 to disengage the sleeve from the teeth 71 (FIG. 2). With the teeth disengaged, any drag occurring at the reverse clutch plate 37 will not be transmitted to the shaft 21 for more efficient operation, as the reverse clutch plate is allowed to rotate at the same speed as the remainder of the clutch assembly.

Although the reverse clutch deactivation means is shown in a form similar to a "Bendix drive", the hub and synchronizer could be activated through the same hydraulic pressure control as for actuation of the forward and reverse clutches. The use of the dual clutch arrangement eliminates the necessity of a forward-neutral-reverse gearing mechanism with a shift fork, which should be less expensive with improved system reliability. A parking brake gear 83 is provided between the gears 18 and 22 to hold the vehicle transmission while in the neutral position.

I claim:

1. In a continuously variable transmission having a driving shaft from the transmission, a forward gear set and a reverse gear set between the driving shaft and a driven shaft, and a forward-neutral-reverse selector to determine which gear set rotates the driven shaft, the improvement comprising a dual clutch assembly between the driving and driven shafts and forming the forward-neutral-reverse selector, the dual clutch assembly including an intermediate pressure plate operatively connected to said driving shaft, a forward pressure plate on one side of said intermediate pressure plate and a reverse pressure plate on the opposite side thereof, each operatively connected to said driving shaft, a forward clutch plate positioned between the forward and intermediate pressure plates, a first sleeve shaft encompassing the driving shaft, operatively connected to said forward clutch plate and carrying a forward gear thereon, a reverse clutch plate positioned between the reverse and intermediate pressure plates, a second sleeve shaft encompassing said first sleeve shaft, operatively connected to said reverse clutch plate and carrying a reverse gear thereon, a source of hydraulic pressure to actuate the forward pressure plate axially toward the intermediate pressure plate to engage the forward clutch plate, and a separate source of hydraulic pressure to independently actuate the reverse pressure plate axially toward the intermediate pressure plate to engage the reverse clutch plate, said separate sources of hydraulic pressure being alternately actuated so that only one of said forward and reverse gear sets is actuated at any one time.

2. A dual clutch assembly in a continuously variable transmission as set forth in claim 1, including means to positively deactivate the reverse clutch plate when the forward clutch plate is engaged to prevent drag losses therefrom.

3. A dual clutch assembly in a continuously variable transmission as set forth in claim 2, in which said reverse gear set includes said reverse gear on said second sleeve shaft and a reverse gear on a hub rotatably mounted on said driven shaft and operatively connected to the sleeve shaft reverse gear, and said forward gear set includes said forward gear on said first sleeve shaft in mesh with a forward gear operatively connected to said driven shaft.

4. In a continuously variable transmission having a driving shaft from the transmission, a forward gear set and a reverse gear set between the driving shaft and a driven shaft, and a forward-neutal-reverse selector to determine which gear set rotates the driven shaft, the improvement comprising a dual clutch assembly forming the forward-neutral-reverse selector, the dual clutch assembly including an intermediate pressure plate operatively connected to said driving shaft, a forward pressure plate on one side of said intermediate pressure plate and a reverse pressure plate on the opposite side thereof, each operatively connected to said driving shaft, a forward clutch plate positioned between the forward and intermediate pressure plates, a first sleeve shaft encompassing the driving shaft, operatively connected to said forward clutch plate and carrying a forward gear thereon, a reverse clutch plate positioned between the reverse and intermediate pressure plates, a second sleeve shaft encompassing said first sleeve shaft, operatively connected to said reverse clutch plate and carrying a reverse gear thereon, a source of hydraulic pressure to actuate the forward pressure plate axially toward the intermediate pressure plate to engage the forward clutch plate, a separate source of hydraulic pressure to independently actuate the reverse pressure plate axially toward the intermediate pressure plate to engage the reverse clutch plate, said separate sources of hydraulic pressure being alternately actuated so that only one gear set is actuated at any one time, said reverse gear set including said reverse gear on said second sleeve shaft and a reverse gear on a hub rotatably mounted on said driven shaft and operatively connected to the sleeve shaft reverse gear, said forward gear set including said forward gear on said first sleeve shaft in mesh with a forward gear operatively connected to said driven shaft, and means to positively deactivate the reverse clutch plate when the forward clutch plate is engaged to prevent drag losses therefrom including a rotatable hub on said driven shaft between said forward and reverse gears, said driven shaft having an external thread formed thereon, and said hub having a complementary meshing internal thread to provide axial motion of the hub upon relative rotation between the hub and driven shaft.

5. A dual clutch assembly in a continuously variable transmission as set forth in claim 4, wherein said reverse gear hub has a flange facing the forward gear with axial teeth thereon, and said hub includes a synchronizer ring and a coupling sleeve thereon, said coupling sleeve having teeth complementary to said reverse gear hub teeth.

6. A dual clutch assembly in a continuously variable transmission as set forth in claim 5, including a torsional spring encompassing said hub assembly with one end anchored to said coupling sleeve and the opposite end anchored to said forward gear so as to resiliently urge the hub and sleeve toward the reverse gear hub.

7. A dual clutch assembly in a continuously variable transmission as set forth in claim 6, in which said coupling sleeve engages the reverse gear hub teeth in the static condition and upon actuation of the reverse clutch plate.

8. A dual clutch assembly in a continuously variable transmission as set forth in claim 6, in which actuation of said forward clutch plate causes rotation of the driven shaft relative to said hub causing retraction of the hub, synchronizer ring and coupling sleeve from the reverse gear hub against the force of the spring.

* * * * *